United States Patent [19]

Patterson et al.

[11] Patent Number: 5,606,782
[45] Date of Patent: Mar. 4, 1997

[54] FASTENER THAT SELF RELEASES AT A VARIABLE SET LOAD

[75] Inventors: Gregory S. Patterson, Raleigh, N.C.; Mark G. Welsh, West Palm Beach, Fla.

[73] Assignee: Turtle Snaps, Inc., West Palm Beach, Fla.

[21] Appl. No.: 424,715

[22] Filed: Apr. 17, 1995

Related U.S. Application Data

[63] Continuation-in-part of Ser. No. 69,116, May 28, 1993, Pat. No. 5,430,914.

[51] Int. Cl.$^6$ ........................................... A44B 21/00
[52] U.S. Cl. ........................................... 24/598.5; 24/602
[58] Field of Search ........................... 24/598.5, 599.5, 24/599.7, 600.2, 601.5, 635, 641, 602, 115 F

[56] References Cited

U.S. PATENT DOCUMENTS

| 602,569 | 4/1898 | Turner . | |
| 3,014,257 | 12/1961 | Huffman | 24/598.5 |
| 3,171,183 | 3/1965 | Johnston | 24/635 |
| 3,413,692 | 12/1968 | Pressley | 24/602 |
| 3,952,382 | 4/1976 | Vaage | 24/598.5 |
| 5,430,914 | 7/1995 | Patterson et al. | 24/598.5 |

*Primary Examiner*—James R. Brittain
*Attorney, Agent, or Firm*—Pennie & Edmonds

[57] ABSTRACT

A fastener that receives and secures an object at one end, such as a rope, cable or line, and releases the object in response to a force or load applied to an opposite end. The releasing feature is adjustable in reference to the force or load required on the opposite end to activate the release of the secured object. The fastener may be manually operated to release the secured object with a lesser force than is required to activate the releasing feature.

22 Claims, 4 Drawing Sheets

FASTENER THAT SELF RELEASES AT A VARIABLE SET LOAD

This application is a continuation-in-part of U.S. application Ser. No. 08/069,116, filed May 28, 1993, now U.S. Pat. No. 5,430,914.

TECHNICAL FIELD

This invention relates to fasteners, and more particularly, to fasteners that self release under a certain load.

BACKGROUND OF INVENTION

Releasing fasteners of the type wherein one end releases an object when a certain force is applied to the other end to prevent breakage or damage of the fastener or an attached object, such as a rope, cable, or line, often require a spring means within the fastener. Most commonly, a female section of the fastener fastens to a mating male portion on the cable, like a cable with a ball end or other mating piece that fits into a female portion of the releasing fastener.

For example, U.S. Pat. No. 602,569 issued to Turner describes a device that utilizes mating male and female parts that release when they are subjected to a force. A tube and clutch interact so that the clutch grips an eyebolt hooked to one end of a spring. The other end of the spring is secured to the farther end of the tube. Under ordinary circumstances, the clutch remains within the tube, but when a certain load exists at the eyebolt end, the clutch is pulled out of the tube and the eyebolt is released.

U.S. Pat. No. 3,014,257 issued to Huffman discloses a device that hooks an object and has spring means to keep the object hooked while being subjected to vibrational stresses.

U.S. Pat. No. 3,171,183 issued to Johnston discloses a fastener with a pair of end members that are adapted for securement. One of the end members has a ball shaped male portion and is held in place by an expandable socket that has a female portion to accept and retain the male portion. A spring holds the expandable socket in the normally closed position.

U.S. Pat. No. 3,413,692 issued to Pressley discloses a fastener that has a linear spring design. A female portion housed in the fastener accepts a ball shaped male portion, which is attached to a cable. At a particular force, the ball shaped male portion and cable are released from the female portion and the fastener.

U.S. Pat. No. 3,952,382 issued to Vaage discloses a fastener that has two hook members that have a spring to bias the hook members open. A sleeve maintains the hook members closed until the sleeve is manually slid away from the hook members so as to allow the hook members to open.

Fasteners that release upon a certain defined load have many applications, such as, but not limited to, the securing of horses during equestrian training and storage, the securing of nautical vessels, and for securing a sail of a ship.

U.S. Pat. No. 602,569 issued to Turner discloses a device that may be adjusted by threading the intermediate cylinder to varying positions versus the inner and outer cylinders; however, Turner does not provide for a way to manually release the secured object. To release the secured object, the undesired load must be met, whether it is met manually or by the introduction of an undesirable load to the device.

Both U.S. Pat. Nos. 3,171,183 issued to Johnston and 3,413,692 issued to Pressley disclose means to fasten to and release from a specially shaped male portion that must conform to the accepting female portion for the fastener to function. The geometric restrictions and limitations of these fasteners limit the end uses and applications of the fasteners; if the desired object to be attached does not conform to the configurations disclosed and required in the patents, the fasteners simply will not perform.

The above mentioned patents do not provide a fastener that may be used for a particular application where the fastener may be set to release from an object at a predetermined load or force, while at the same time having the capability to easily attach or release the fastener manually with one hand.

What is needed is a fastener that fastens with one hand to a variety of objects that do not have to mate with the fastener, wherein the fastener releases upon a predetermined force or load being introduced to the fastener, wherein the fastener may be manually released with one hand, even while the fastener is under load, and wherein the fastener may be adjusted to release at any one of a range of forces.

DISCLOSURE OF THE INVENTION

It is, therefore, an object of the present invention to provide a fastener that releases an existing secured object upon being introduced to a certain force or load.

It is also an object of the present invention to provide a fastener that may be manually released from an existing secured object being fastened, wherein the manual release feature requires less force than the force required to activate the self-releasing feature.

It is also an object of the present invention to provide a fastener that may be manually released from an existing secured object with a simple one hand operation or movement.

It is also an object of the present invention to provide a fastener that fastens to a variety of objects that have different shapes or sizes.

It is also an object of the present invention to provide a fastener that easily attaches to an object with one hand.

It as also an object of the present invention to provide a fastener that may be adjusted to release at a predetermined force or load.

It is also an object of the present invention to provide a fastener that fastens to a variety of objects that have different sizes and shapes at one end and that may be secured by an attachment at the other end, wherein the attachment may be of a variety of shapes and sizes.

It is also an object of the present invention to provide a simplified self-contained fastener.

It is also an object of the present invention to provide a fastener that has a coaxial design that allows for a compact final assembly of the fastener.

It is also an object of the present invention to provide a fastener that has a simple assembly, and therefore, lowers the cost of manufacturing the fastener.

Yet another object of the present invention is to provide a fastener that requires fewer parts for operation, and therefore, lowers manufacturing costs of producing the fastener.

According to the present invention, a fastener is provided that has a coaxial inner cylinder housing and outer cylinder housing. A pair of jaws grips an existing object, such as a first rope or a first line, and secures the gripped object at a first end, or gripping end. The jaws, which are biased open by a jaw spring, are in sliding contact with the outer cylinder housing, and the jaws are held closed when the fastener is at rest.

At a second end, an existing line is attached to a strap bracket. As a force or load is exerted through the fastener, the inner cylinder housing transfers the stress of the load to an inner spring. The outer cylinder housing is displaced by the inner cylinder housing, which frees the jaws from the outer cylinder housing. The jaws are biased open and allow the release of the secured object.

An outer cylindrical spring allows the outer cylinder housing to be displaced versus the inner cylinder housing manually so as to free the jaws from the outer cylinder housing using less force than is required to activate the self releasing feature. Therefore, the secured object may be released manually with a simple one hand axial motion.

The fastener of the present invention has adjustment means to adjust the amount of force or load that is required to activate the self releasing feature. The adjustment means adjusts the amount of compression of the inner spring so that the force required to displace the cylinders and activate the self releasing feature is adjustable.

In another separate embodiment, a fastener has an outer cylinder housing that has a locking feature in relation to an inner cylinder housing so that the fastener may be operated with the self releasing feature as described above, or the fastener may be locked so that the fastener does not self release.

In yet a separate embodiment, a fastener has an outer cylinder housing that is displaced in varying degrees in relation to an inner cylinder housing so that the self releasing feature is activated at different forces depending on the amount of displacement of the outer cylinder housing in relation to the inner cylinder housing.

The fastener of the present invention provides fastening means that fastens to a variety of objects that do not have to mate with the fastener, wherein the fastener releases upon a predetermined force or load being introduced to the fastener, wherein the fastener may be manually released, and wherein the fastener may be adjusted to release at any one of a range of forces.

The foregoing and other objects, features and advantages of the present invention will become more apparent in light of the following detailed description of the preferred embodiments thereof as shown in the accompanying drawings.

BEST MODE FOR CARRYING OUT THE INVENTION

Figure 1:
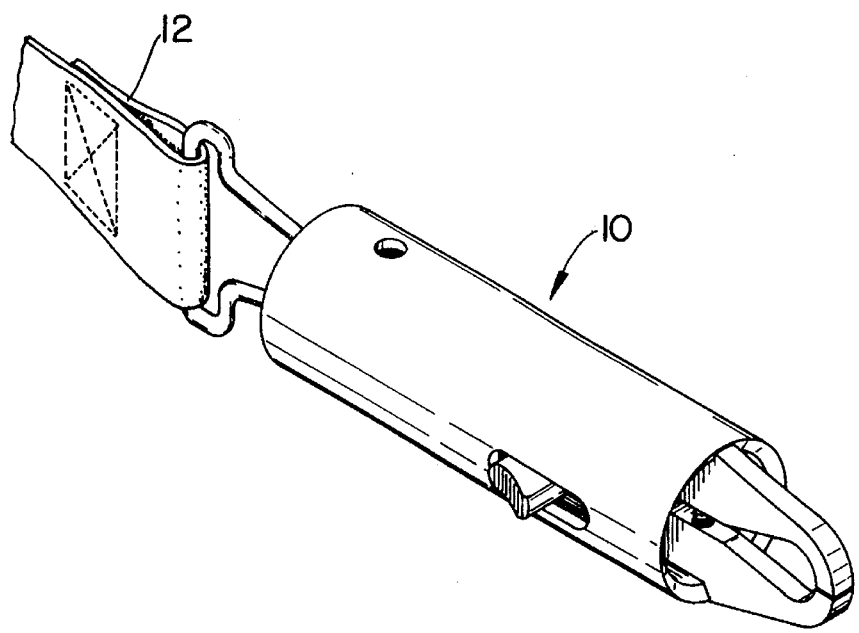
FIG. 1 is a perspective view of a fastener of the present invention as the fastener appears in the normally closed position.

According to the present invention, a fastener 10 is provided and shown in FIG. 1. The fastener 10 of the present invention may be attached to an existing line or strap 12.

Figure 2:
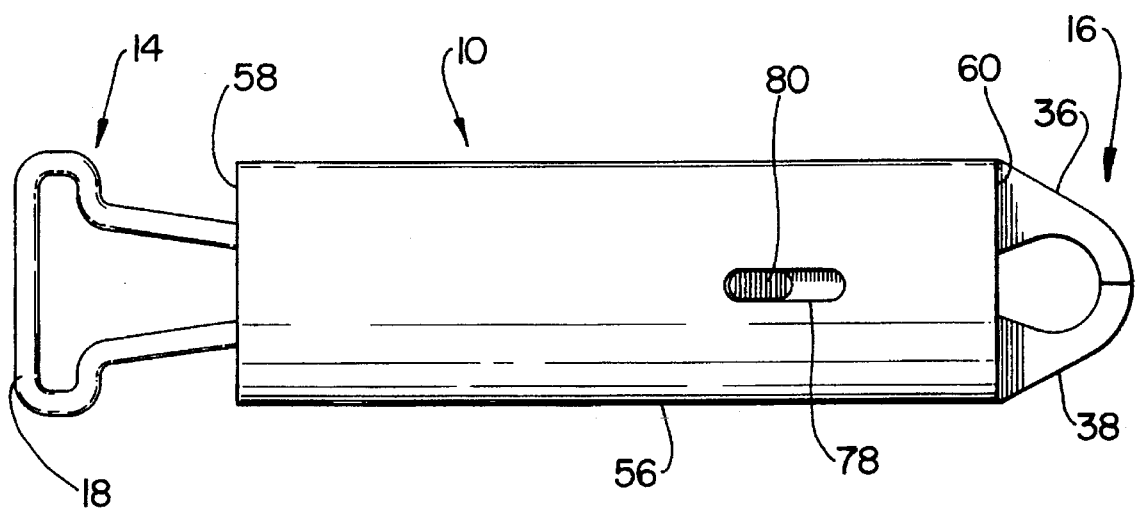
FIG. 2 is a top view of the fastener of the present invention as the fastener appears in the normally closed position.
Figure 3:
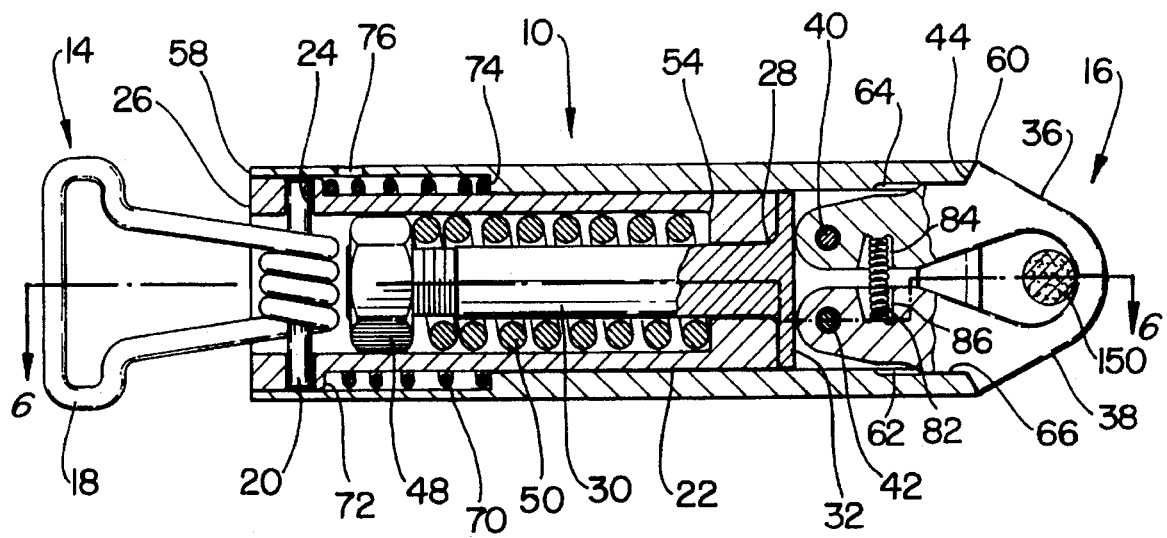
FIG. 3 is a sectional view taken along line 3—3 in FIG. 5, showing the top view of the fastener of the present invention as the fastener appears in the normally closed position.

As shown in FIG. 2, the fastener 10 has a first end 14, or strap end 14, and a second end 16, or securing end 16. A first tensile force of a certain magnitude is applied to the strap end 14 relative to the securing end 16 through a strap bracket 18, which is attached to the fastener 10 by an inner cylindrical housing pin 20, as shown in the cross sectional view of FIG. 3. An expansion pin may be used for the inner cylindrical housing pin 20 to prevent movement of the pin. The strap bracket 18 is of sufficient width so that a variety of sizes of straps may be attached to the strap bracket 18.

An inner cylindrical housing 22 has an inner cylindrical pin opening 24, which houses the inner cylindrical pin 20.

The inner cylindrical housing 22 has an inner cylindrical housing first opening 26 at the strap end 14 and an inner cylindrical housing second opening 28 at the securing end 16.

A threaded rod 30 is positioned inside the inner cylindrical housing 22 and extends axially from the inner cylindrical housing second opening 28 to the inner cylindrical housing first opening 26. A threaded rod shoulder 32 is coaxial with and adjacent to the threaded rod 30. The threaded rod shoulder 32 extends axially from the inner cylindrical housing second opening 28 to the fastener securing end 16. The threaded rod shoulder 32 has a jaw slot 34 for housing a first jaw 36 and a second jaw 38.

The securing end 16 comprises the first jaw 36 and the second jaw 38. The first jaw 36 pivots about a first jaw pin 40, and the second jaw 38 pivots about a second jaw pin 42. The first-and second jaw pins 40 and 42 are secured to the threaded rod shoulder 32. The first and second jaws 36 and 38 each have an outer shoulder 44 and 46. Expansion pins may be used for the jaw pins 40 and 42 to prevent movement of the pins.

The threaded rod 30 has an adjustment nut 48 threaded onto the end of the threaded rod 30 to contain and adjust the tension of an inner helical compression spring 50 positioned radially outside of the threaded rod 30 and radially inside of the inner cylindrical housing 22.

Figure 4:
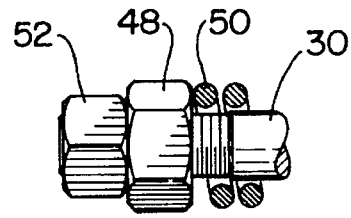
FIG. 4 is a close up view of the present invention showing a jam nut placed adjacent to an adjustment nut.

As shown in FIG. 4, a jam nut 52 may be engaged onto the threaded rod 30 adjacent to the adjustment nut 48 to prevent axial movement of the adjustment nut 48 along the threaded rod 30.

The inner helical compression spring 50 is contained by the adjustment nut 48 at one side and an inner cylindrical inwardly extending lip 54 at the inner cylindrical housing second opening 28.

An outer cylindrical housing 56 is positioned coaxially with and radially outside of the inner cylindrical housing 22. The outer cylindrical housing 56 has an outer cylindrical housing first opening 58 at the strap end 14 and an outer cylindrical housing second opening 60 at the securing end 16.

The outer cylindrical housing 56 has a first inside groove 62 and a symmetrical second inside groove 64, with each groove extending axially from the outer cylindrical housing second opening 60 and the securing end 16. The first inside groove 62 has a first inside wall 66, and the second inside groove 64 has a second inside wall 68. The first jaw 36 and the first inside groove 62 are in sliding contact with each other, and the second jaw 38 and the second inside groove 64. The first and second inside grooves 62 and 64 properly align the path of the jaws 36 and 38 during operation of the fastener 10.

An outer helical compression spring 70 is positioned radially outside of the inner cylindrical housing 22 and radially inside of the outer cylindrical housing 56. The outer helical compression spring 70 pushes against an inner cylindrical housing outwardly extending lip 72 at the strap end 14 and against an outer cylindrical housing inwardly extending shoulder 74 at the securing end 16. The outer cylindrical housing second opening 60 is sized so as to allow free sliding motion of the outer cylindrical housing 56 over and along the inner cylindrical housing 22.

When the fastener 10 is at rest, the first and second jaws 36 and 38 are forced closed against each other by the contact of the first and second inside walls 66 and 68 against the jaw shoulders 44 and 46. The contact results from the outer cylindrical housing 56 being forced toward the securing end 16 of the fastener 10 relative to the inner cylindrical housing 22 by the outer helical compression spring 70.

The first and second jaws 36 and 38 are drawn securely against the inner cylindrical housing 22 by the inner helical compression spring 50. The outer cylindrical housing 56 forces the jaws 36 and 38 together to secure an existing object 150, which does not have to conform to any particular size or shape to be secured by the fastener 10. The existing object 150, however, must be of a size that fits within the jaws 36 and 38.

The outer cylindrical housing 56 has an outer cylindrical housing assembly opening 76, which is used as an assembly aid to position the inner cylindrical housing pin 20 through the inner cylindrical housing 22 and the strap bracket 18.

Figure 5:
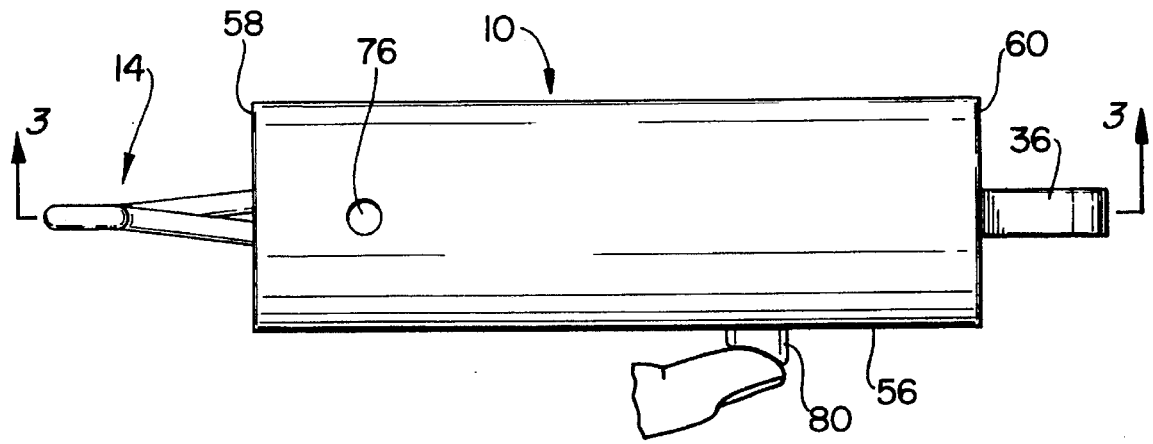
FIG. 5 is side view of the fastener of the present invention as the fastener appears in the normally closed position.
Figure 6:
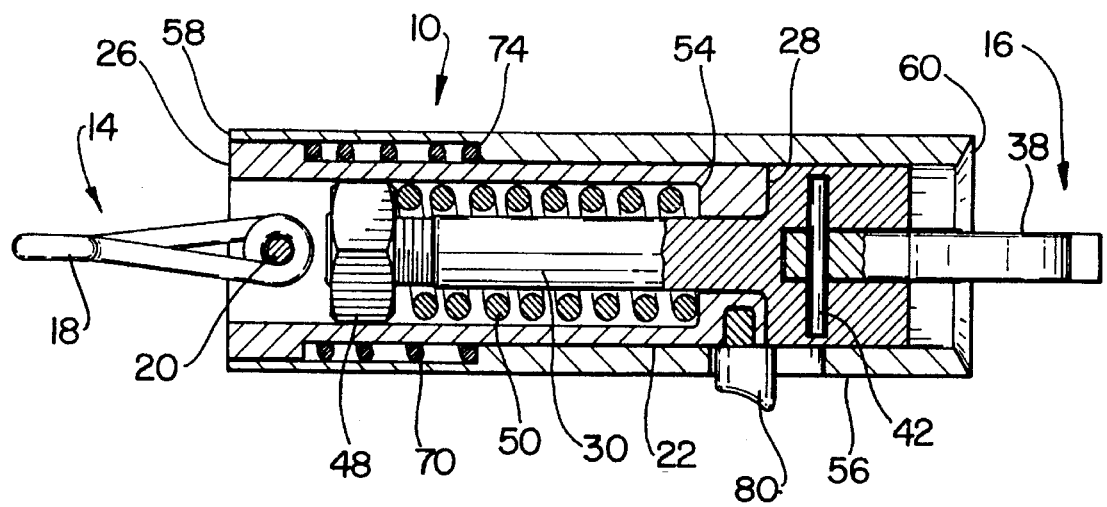
FIG. 6 is a sectional view taken along line 6—6 in FIG. 3, showing the side view of the fastener of the present invention as the fastener appears in the normally closed position.
Figure 7:
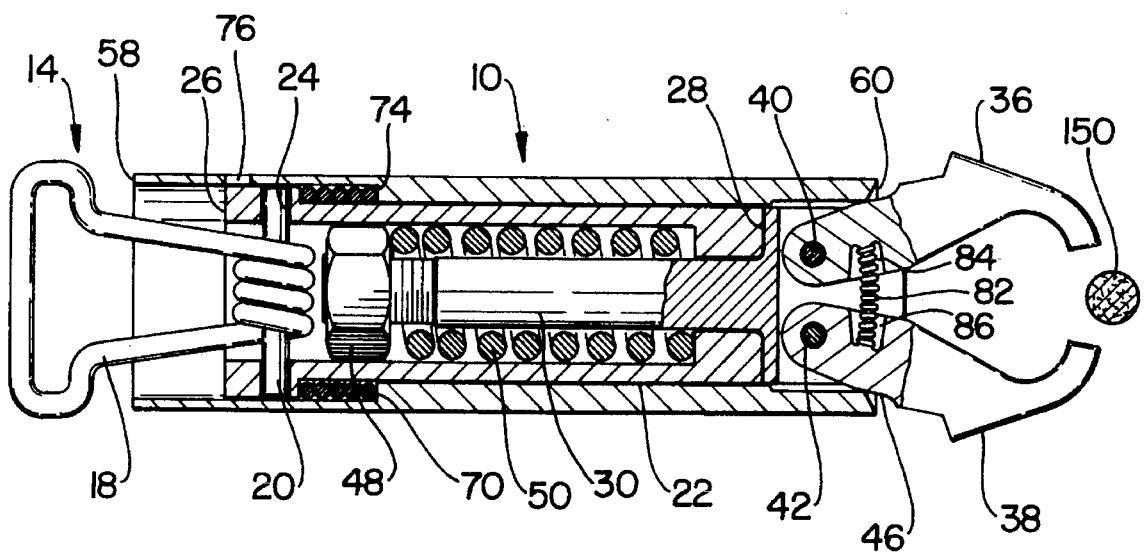
FIG. 7 is a sectional view showing the top view of the fastener of the present invention releasing the secured object while being manually opened by using a thumbrest.

FIGS. 5, 6, and 7 illustrate the fastener 10 being opened manually. The outer cylindrical housing 56 has a slot 78, as shown in FIG. 2, to accommodate axial movement of a thumbrest 80 to manually open the first and second jaws 36 and 38. The thumbrest 80 extends radially from the inner cylindrical housing 22 and beyond the outer cylindrical housing 56 through the slot 78. The thumbrest 80 is secured to the inner cylindrical housing 22 by any means such as being welded, threaded or cast integrally with the inner cylindrical housing 22.

The outer helical compression spring 70 has less tension than the inner helical compression spring 50; therefore, the jaws may be manually opened by pushing the thumbrest 80 forward relative to the outer cylindrical housing 56, which frees the first and second jaws shoulders 44 and 46 from contacting the first and second inside walls 66 and 68.

The first and second jaws 36 and 38 are biased open when set free from the outer cylindrical housing 56 by use of a jaw helical compression spring 82, which is positioned inside a first jaw slot 84 inside of the first jaw 36 and a second jaw slot 86 inside of the second jaw 38.

In a separate mode of operation, the fastener 10 may be manually released under a load by the user applying a force towards the strap end 14 to the outer cylindrical housing 56.

Figure 8:
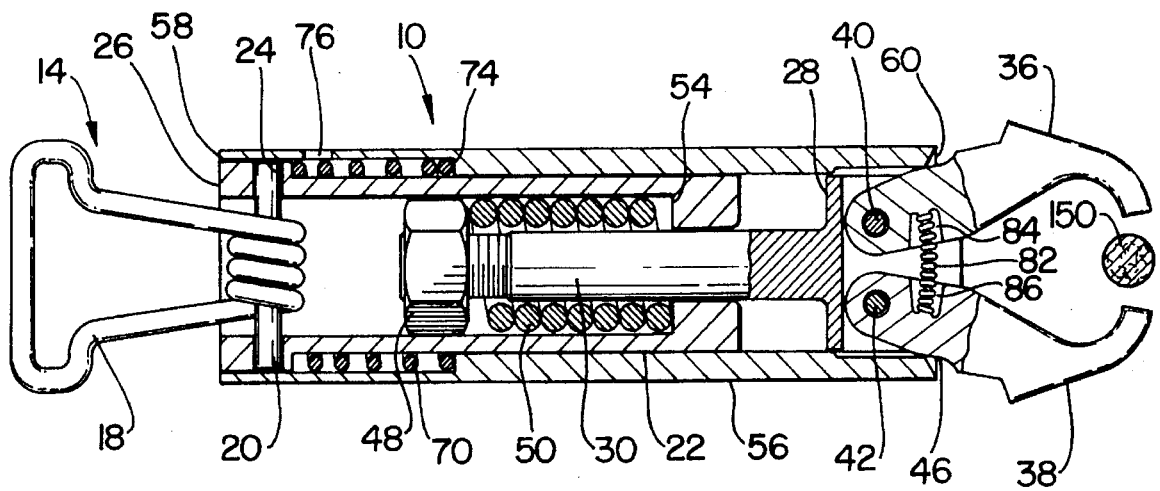
FIG. 8 is a sectional view showing the top view of the fastener of the present invention releasing an existing secured object as a force is applied through a bracket.

FIG. 8 illustrates the fastener 10 being activated while under a predetermined tensile force or load placed upon the inner cylindrical housing pin 20 through the strap bracket 18 at the strap end 14.

The jaws 36 and 38 are allowed to open during the self release operation, which frees the object 150 secured by the first jaw 36 and the second jaw 38. The force upon the inner cylindrical housing pin 20 causes the inner cylindrical housing 22 and the inwardly extending lip 54 to compress the inner helical compression spring 50. As the inner cylindrical housing 22 moves toward the strap end 14, the thumbrest 80 engages the bottom of slot 78 in the outer cylindrical housing 56, which moves the outer cylindrical housing 56 towards the strap end 14. The first jaw 36 and the second jaw 38, which have the object 150 secured, remain closed until contact between the jaw shoulders 44 and 46 and the first and second inside walls 66 and 68 are no longer maintained. The first and second jaws 36 and 38 then open and release the object 150 from the fastener 10, which eliminates the reactionary force that caused the fastener 10 to activate the self releasing feature.

After release of the object 150, the compressed force of the inner helical compression spring 50 forces the fastener 10 to automatically return to the at-rest and normally closed position.

The point of self release may be adjusted to different forces that the fastener 10 absorbs at the strap end 14. The adjustment is accomplished through the adjustment nut 48. If the adjustment nut 48 is adjusted to apply more compressive force to the inner helical compression spring 50, then more force is required at the strap end 14 to activate the self releasing feature of the fastener 10. The point of self release may be adjusted to a variety of release points depending on the end use and application of the fastener. Different sizes of inner helical springs 50 also will provide a fastener 10 with a variety of self release points available to the user.

Figure 9:
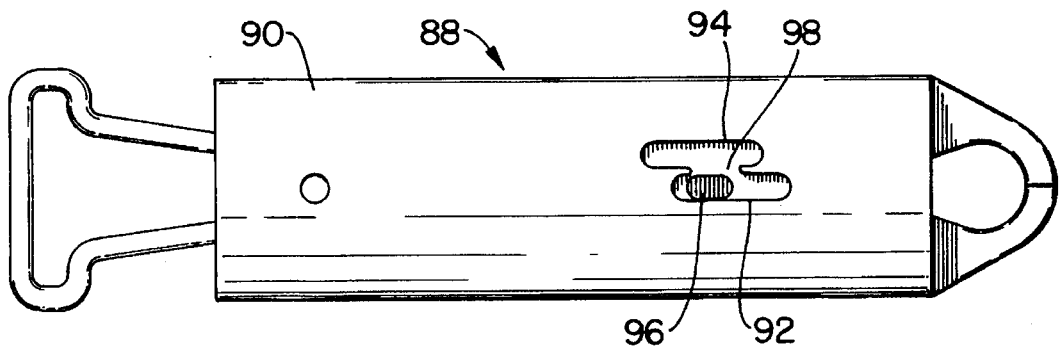
FIG. 9 is a top view of a separate embodiment of a fastener of the present invention, wherein the fastener may have a locked mode of operation.
Figure 10:
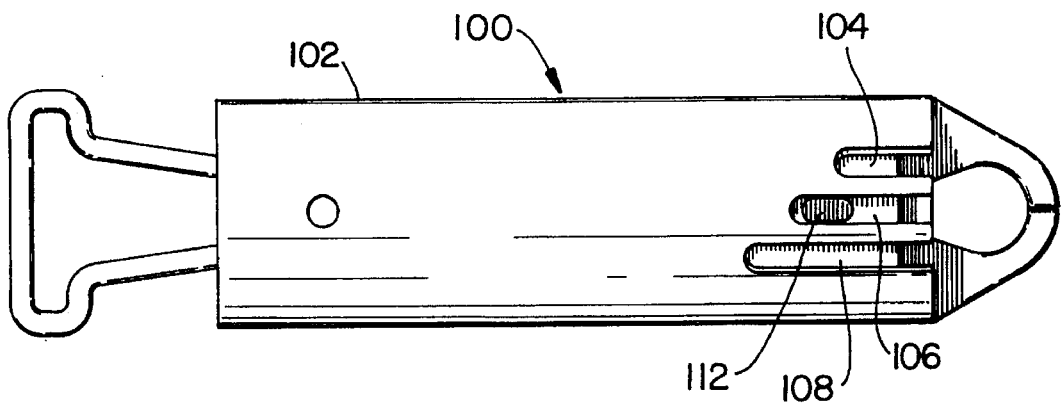
FIG. 10 is a top view of a separate embodiment of a fastener of the present invention, wherein the fastener may have a setting for a variety of different loads to activate the self release feature, which in this embodiment is built into an outer cylinder housing.

A separate embodiment of the present invention is shown in FIG. 9. A fastener 88 has the same essential elements as the above preferred embodiment, except that an outer cylindrical housing 90 does not have the outer cylindrical wall grooves 62 and 64, but has an axially extending first slot 92 from the securing end and an adjacent axially extending second slot 94 adjacent and parallel to the first slot 92. A thumbrest 96 is located in one of the slots. The second slot 94 is axially offset towards the strap end 14 in relation to the first slot 92. A slot opening 98 connects the first and second slots 92 and 94.

The thumbrest 96 may be positioned in the first slot 92 for similar operation of the preferred embodiment, or the thumbrest 96 may be positioned in the second slot 94. The second slot 94 is axially located and of the proper length so that when the thumbrest 96 is located in the second slot 94, the fastener 88 is prevented from opening the securing end and jaws. When the thumbrest 96 is positioned in the second slot 94, the fastener 88 is in a locked position, so that the user may easily deactivate the self releasing feature of the fastener 88.

In yet another separate embodiment, a fastener 100 has the same elements as the preferred embodiment disclosed above, except that the fastener has an outer cylindrical housing 102 that does not have the outer cylindrical inside grooves 62 and 64, but has a first slot 104 that extends axially from the securing end. A second slot 106 also extends axially from the securing end, and a third slot 108 extends axially from the securing end. The slots 104, 106, and 108 all terminate at an outer cylindrical housing second opening 110.

The second slot 106 is axially longer than the first slot 104, and the third slot 108 is axially longer than the second slot 106. A thumbrest 112 is positioned in one of the slots. The longer the slot, the larger of a magnitude of force at the strap end is required to open the securing end and the jaws to free the secured object.

The design of fastener 100 allows the user to easily adjust the point of self release for the fastener by positioning the thumbrest 112 in a certain slot of varying depth.

One of the slots may axially extend from the securing end at a sufficient distance, so that the inner compression spring becomes fully compressed before the thumbrest 112 engages the outer cylindrical housing 102. This mode of operation would allow the fastener 100 to have a locking feature.

The construction of the fastener may be made with a number of materials including corrosion resistant alloys and polymers such as stainless steel, titanium, aluminum, zinc, monel alloys, nylon 6/6, glass-filled nylon, and silicon RTV rubber polyurethane, or any combination thereof.

The fastener of the preferred embodiment has been made with the outer cylindrical housing made from nylon 6/6 with a closed loop slot to maintain hoop stress.

The fastener of the present invention provides fastening means that fastens to a variety of objects that do not have to mate exactly with the fastener. The fastener of the present invention releases upon a predetermined force or load being introduced to the fastener and may be adjusted to release at any one of a range of forces. The fastener of the present invention also may be manually released with a lesser force than is required to activate the self releasing feature. The fastener manually releases by the user pulling the outer cylindrical housing 44 with or without a load on the strap end 12, which is desirable in many instances Although the invention has been shown and described with respect to a preferred embodiment thereof, it should be understood by those skilled in the art that other various changes and omissions in the form and detail thereof may be made therein without departing from the spirit and scope of the invention.

We claim:

1. A fastener that has a strap end and a securing end where said securing end secures an existing object and releases said object when a first force of a certain magnitude is applied to said strap end, comprising:

an outer cylindrical housing;

an inner cylindrical housing concentric with and inside of said outer cylindrical housing;

a thumbrest extending radially from said inner cylindrical housing and beyond said outer cylindrical housing;

first spring means positioned inside of said inner cylindrical housing, so that said first spring means absorbs said first force when applied to said strap end and so that said thumbrest engages said outer cylindrical housing to open said securing end and free said object.

2. The fastener of claim 1, further comprising:

second spring means positioned inside of said outer cylindrical housing and outside of said inner cylindrical housing, so that said second spring means absorbs a second force applied to said outer cylindrical housing or to said thumbrest to manually open said securing end and free said object.

3. The fastener of claim 2, wherein said securing end comprises a first jaw and a second jaw, wherein said first jaw pivots about a first jaw pin and said second jaw pivots about a second jaw pin.

4. The fastener of claim 3 wherein, said securing end has spring means to bias the securing end open.

5. The fastener of claim 4, wherein the outer cylinder housing further comprises:

an inner wall surface;

a first groove and a second groove at said inner wall surface and extending axially from said securing end, so that said first jaw and said second jaw are in sliding contact with said first groove and said second groove respectively.

6. The fastener of claim 3, further comprising a rod extending into said inner cylindrical housing and said jaws pins are secured to said rod.

7. The fastener of claim 6, wherein said rod further comprises means for adjusting the tension of said first spring means and the force required to activate the self releasing feature.

8. The fastener of claim 7, wherein said means for adjusting the tension of said first spring means comprises said rod having a threaded portion and an adjustment nut engaging said threaded portion, said adjustment nut compressing said first spring means.

9. The fastener of claim 8, further comprising a jam nut engaging said threaded portion adjacent to said adjustment nut, so that said jam nut prevents axial movement of said adjustment nut along said threaded portion.

10. The fastener of claim 2, wherein the outer cylindrical housing further comprises:

a first slot extending axially from said securing end;

a second slot extending axially from said securing end, said second slot being adjacent and parallel to said first slot, the second slot being axially offset towards said strap end in relation to said first slot;

a slot opening connecting said first and second slots, so that said thumbrest may be positioned in the first slot for self release mode of operation or said thumbrest may be positioned in said second slot and so that said fastener is prevented from opening said securing end.

11. The fastener of claim 2, wherein the outer cylindrical housing further comprises:

a first slot extending axially from said securing end;

a second slot extending axially from said securing end, said second slot being longer than said first slot;

a third slot extending axially from said securing end, said third slot being longer than said second slot, so that said thumbrest is positioned in one of said slots and with each slot in numeric order requiring said first force to be of a larger magnitude to open said gripping end and free said object.

12. The fastener of claim 11, wherein the third slot extends axially from said securing end at a sufficient distance, so that said first springs means is fully compressed before said thumbrest engages said outer cylindrical housing.

13. A fastener that has a strap end and a securing end where said securing end secures an existing object and releases said object when a first force of a certain magnitude is applied to said strap end, comprising:

an outer cylindrical housing having an outer cylindrical housing first opening, an outer cylindrical housing second opening, and a slot;

an inner cylindrical housing concentric with and inside of said outer cylindrical housing, where said inner cylindrical housing has an inner cylindrical housing first opening and an inner cylindrical housing second opening;

a thumbrest extending radially from said inner cylindrical housing and beyond said outer cylindrical housing through said slot, said inner cylindrical first opening having an outwardly extending lip and said inner cylindrical housing second opening having an inwardly extending lip;

said strap end having a strap bracket fastened to an inner cylindrical housing pin secured in said inner cylindrical housing;

said securing end having a rod that extends axially into said inner cylindrical housing;

first spring means positioned radially inside of said inner cylindrical housing, radially outside of said rod, and adjacent to said inwardly extending lip at said inner cylindrical housing second opening, so that said first spring means absorbs said first force when applied to said strap end so that said thumbrest engages said outer cylindrical housing to open said securing end and free said object.

14. The fastener of claim 13, further comprising:

second spring means positioned radially inside of said outer cylindrical housing and outside said inner cylindrical housing, so that said second spring means absorbs a second force applied to said outer cylindrical housing or to said thumbrest to manually open said securing end and free said object.

15. The fastener of claim 14, wherein said securing end comprises a first jaw and a second jaw, wherein said first jaw pivots about a first jaw pin and said second jaw pivots about a second jaw pin.

16. The fastener of claim 15, further comprising said rod extending into said inner cylindrical housing and said jaws pins are secured to said rod.

17. The fastener of claim 16, wherein said rod of said securing end has means for adjusting the tension of said first spring means.

18. The fastener of claim 17, wherein said means for adjusting the tension of said first spring means comprises said rod having a threaded portion and an adjustment nut engaging said threaded portion, said adjustment nut compressing said first spring means.

19. The fastener of claim 18, further comprising a jam nut engaging said threaded portion adjacent to said adjustment nut, so that said jam nut prevents axial movement of said adjustment nut along said threaded portion.

20. The fastener of claim 14, wherein a line is attached to said strap bracket.

21. The fastener of claim 14, wherein said securing end has spring means to bias the securing end open.

22. A fastener having a first jaw and second jaw, said jaws used for securing an existing object, comprising:

an outer cylindrical housing having an outer cylindrical housing first opening, said inner cylindrical housing having an outwardly extending lip, an outer cylindrical housing second opening, and a slot extending axially from said outer cylindrical housing second opening, said outer cylindrical housing second opening having an inwardly extending shoulder and an outer cylindrical housing inner wall;

an inner cylindrical housing having an inner cylindrical housing first opening, an inner cylindrical housing second opening, an inner cylindrical housing pin fastened to said inner cylindrical housing, and a thumbrest extending radially beyond said outer cylindrical housing, said inner cylindrical housing second opening having an inwardly extending lip, said inner cylindrical housing positioned inside said outer cylindrical housing;

a strap bracket attached to the inner cylindrical housing pin;

a threaded rod extending into said inner cylindrical housing through said inwardly extending lip, said rod adjacent to said jaws, the rod having an adjustment nut engaging said threads;

an inner cylindrical spring positioned inside said inner cylindrical housing and outside said rod, said inwardly extending lip and said adjustment nut containing said inner cylindrical spring, said inner cylindrical spring absorbing a first force when applied to said strap bracket;

an outer cylindrical spring positioned inside said outer cylindrical housing and outside said inner cylindrical housing, said inwardly extending shoulder and said inner cylindrical housing outwardly extending lip containing said outer cylindrical spring;

a jaw spring positioned between said jaws biasing said jaws open, said jaws each having a pivot pin and a pivot jaw shoulder so that said outer cylindrical housing inner wall contacts each said jaw shoulder forcing said first jaw and said second jaw together when said apparatus is at rest and so that when a certain first force is applied to said strap bracket applying tensile stress to said apparatus, said inner cylindrical housing spring yields to said first force and said thumbrest moves said outer cylindrical housing away from said jaws so that said jaws pivot away from each other and said object is released;

and where, in a separate operation, said outer cylindrical spring absorbs a second force when said second force is applied to said outer cylindrical housing to manually open said jaws.

\* \* \* \* \*